(12) United States Patent
Voyatzakis et al.

(10) Patent No.: US 10,334,860 B1
(45) Date of Patent: Jul. 2, 2019

(54) DOUGH STRETCHER

(71) Applicant: Somerset Industries, Inc., Lowell, MA (US)

(72) Inventors: Andrew D Voyatzakis, Carlisle, MA (US); George Athanasiadis, Lexington, MA (US)

(73) Assignee: Somerset Industries, Inc., Lowell, MA (US)

( * ) Notice: Subject to any disclaimer, the term of this patent is extended or adjusted under 35 U.S.C. 154(b) by 65 days.

(21) Appl. No.: 15/806,413

(22) Filed: Nov. 8, 2017

Related U.S. Application Data

(60) Provisional application No. 62/418,946, filed on Nov. 8, 2016.

(51) Int. Cl.
*A21C 3/02* (2006.01)
*A21C 3/00* (2006.01)

(52) U.S. Cl.
CPC . *A21C 3/02* (2013.01); *A21C 3/00* (2013.01)

(58) Field of Classification Search
CPC .................................. A21C 3/00; A21C 3/02
See application file for complete search history.

(56) References Cited

U.S. PATENT DOCUMENTS

| | | | |
|---|---|---|---|
| 1,087,564 A | 2/1914 | Aldred et al. | |
| 4,514,089 A | 4/1985 | Maynet | |
| 6,067,897 A * | 5/2000 | Grieco | A21C 11/004 425/337 |
| 6,711,991 B2 * | 3/2004 | Tomatis | A21C 11/008 99/349 |
| 6,769,898 B1 | 8/2004 | Voyatzakis et al. | |
| 7,001,170 B1 | 2/2006 | Voyatzakis et al. | |

* cited by examiner

*Primary Examiner* — Joseph S Del Sole
*Assistant Examiner* — John Robitaille
(74) *Attorney, Agent, or Firm* — Altman & Martin; Steven K Martin

(57) ABSTRACT

A dough stretcher comprising a drive shaft mounted to rotate on a vertical system axis and a mechanism for rotating the drive shaft at a speed in the range of between 40 RPM and 100 RPM. The bottom end of a lower platen shaft is attached to the drive shaft to extend upwardly an angle of from 1° to 4° from the system axis. The lower platen is mounted to the top end of the lower platen shaft so that it rotates perpendicularly about the lower platen shaft. An upper platen is mounted above the lower platen to reciprocate vertically to the lower platen. In operation, as the upper platen is lowered, it touches the dough on the lower platen. As the lower platen gyrates, the upper platen flattens the dough and pushes it outwardly toward the edge.

20 Claims, 7 Drawing Sheets

DOUGH STRETCHER

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to dough preparation, more particularly, to machines for stretching and flatten dough.

2. Description of the Related Art

Currently, there are two basic methods for stretching dough. The first is stretching by hand. There are a number of shortcomings to hand stretching. It takes a skilled operator and, even then, there are issues of consistency leaving every piece different. Hand stretching is time-consuming, which means that it is slow and expensive.

Another method of stretching dough is by the use of a heated dough press. To stretch the dough, three elements are needed: heat, pressure, and spraying oil. All of these are necessary to relax the dough for stretching and flattening. Further, a special mold is needed if a raised edge is desired.

There are a number of shortcomings of this method. Because heat is needed, it consumes a lot of energy and is expensive to manufacture. Further, the heat must be adjusted properly and the product must be cooked immediately in order to avoid over-proofing. Molds are expensive to manufacture and a different mold is needed for each size. Over 1000 pounds of pressure is required to stretch even soft dough, which means a high-power reciprocating mechanism is needed. The oil is sprayed on the dough, which adds cost and mess.

BRIEF SUMMARY OF THE INVENTION

The dough stretcher of the present invention with an upper platform supported above a lower platform. The lower platform supports a gyrating mechanism that moves the lower platen in the desired manner. A motor, either directly or indirectly, rotates a drive shaft on the vertical system axis at a rotational speed of from 40 to 100 RPM.

The bottom end of a lower platen shaft is attached to the drive shaft so that the lower platen shaft axis is at a tilt angle of from 1° to 4° to the system axis. The lower platen shaft can be attached to the drive shaft directly by, for example, bending a single rod or welding two rods together at the tilt angle, or indirectly by a collar connecting the drive shaft and the lower platen shaft.

The bottom surface of the lower platen is attached to the top end of the lower platen shaft by a rotating bearing that allows the lower platen to rotate freely perpendicularly to the lower platen shaft axis. Because the lower platen shaft tilts at the tilt angle from vertical, the top surface of the lower platen is tilted at the same tilt angle from horizontal. As the motor rotates, when looking at the edge of the lower platen, the top surface appears to form a flattened X when seen from the side. Also, the center of the top surface traces a circle with a diameter ranging from 0.5" to 1.5" around the system axis when seen from the top.

The top surface of the lower platen is flat so as to accept a dough ball directly onto the surface and/or clips on the lower platen perimeter hold a pizza pan so the that dough ball can be stretched directly in the pan.

The upper platform supports a reciprocating mechanism by which the operator raises and lowers an upper platen. The top surface of the upper platen is attached to the bottom end of an upper platen shaft by whatever means is adequate and any reciprocating mechanism known in the art can be employed. Typically, the reciprocating mechanism is operated manually. Optionally, the reciprocating mechanism can be operated electrically or pneumatically.

Optionally, the lower platen and/or the upper platen is removable.

To operate, a dough ball is placed in the center of the lower platen and the motor is turned on. As the upper platen is lowered, it touches the dough. As the lower platen gyrates, the upper platen flattens the dough and pushes it outwardly toward the edge of the lower platen.

To facilitate stretching, the upper platen can have different configurations. In one, the upper platen edge is beveled such that the bottom surface is smaller in diameter than the top surface. In another, the bottom surface is formed with an annular shoulder around the edge to produce a raised edge on the dough.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

The present application hereby incorporates by reference in its entirety U.S. Provisional Patent Application No. 62/418,946, on which this application is based.

Figure 1:
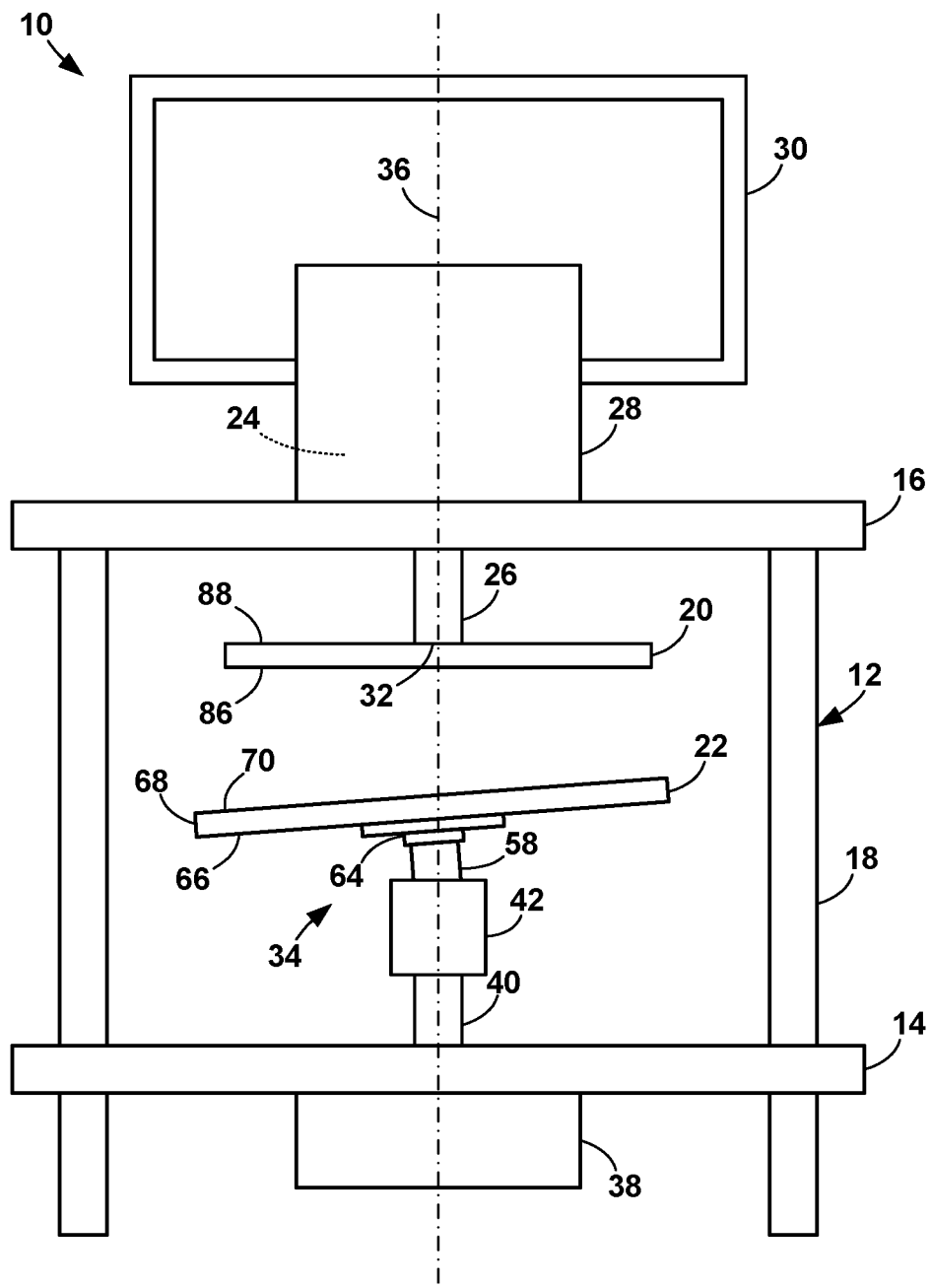
FIG. 1 is a side view of the dough stretcher of the present invention.

The dough stretcher 10 of the present invention, shown in FIG. 1, is housed in a frame 12. The frame 12 has a lower platform 14 and an upper platform 16. In the present design, vertical supports 18 hold the upper platform 16 above the lower platform 14.

The lower platform 14 supports a gyrating mechanism 34 that moves the lower platen 22 in the desired manner. A drive shaft 40 rotates coaxially with the vertical system axis 36. Typically, the drive shaft 40 is rotated by an electric motor 38, either directly or indirectly through a gear train, belt/chain drive, or other transmission means. The present invention contemplates that any appropriate method of rotating the drive shaft 40 can be employed.

The drive shaft 40 has a rotational speed in the range of from 40 rotations per minute (RPM) to 100 RPM. In the present design, the rotational speed is about 78 RPM.

Figure 2:
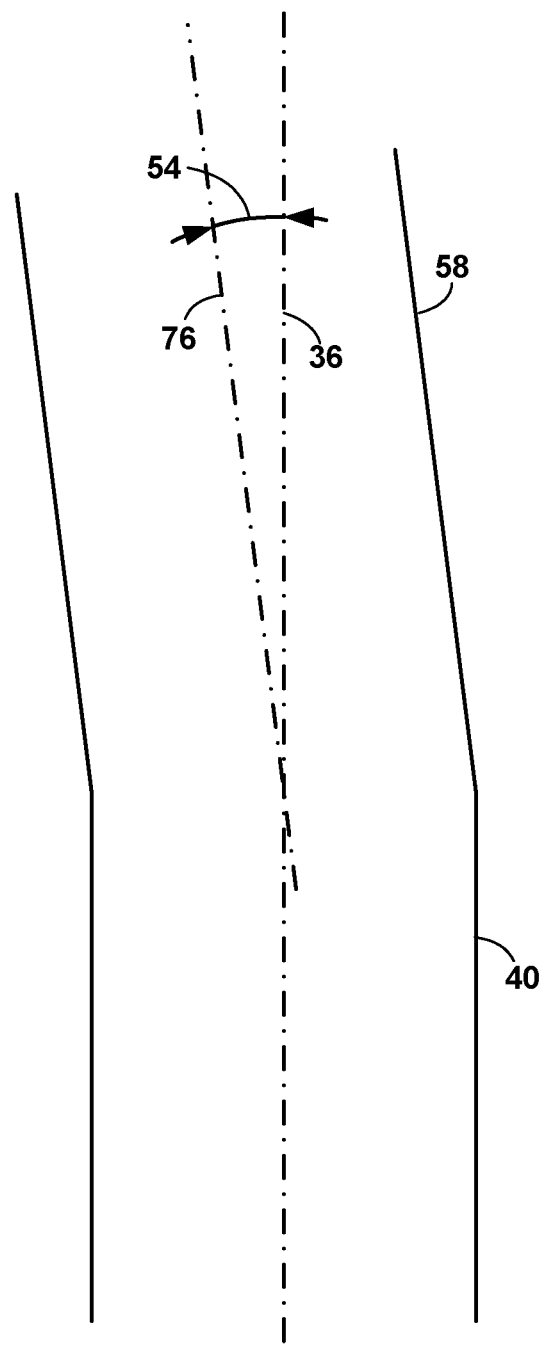
FIG. 2 is a detailed view of the tilt angle between the drive shaft and the platen shaft.

The bottom end 60 of a lower platen shaft 58 is attached to the drive shaft 40 so that the lower platen shaft axis 76 is at a tilt angle 54 to the system axis 36, as shown in FIG. 2. The tilt angle 54 is in the range of from 1° to 4° and is preferably about 3°. Unless otherwise indicated, remainder of the present specification assumes that the tilt angle is 3°.

Any method of attaching the lower platen shaft 58 to the drive shaft 40 at the tilt angle 54 is contemplated by the present invention. In one method, the drive shaft 40 and the lower platen shaft 58 are a single rod that is bent at the desired tilt angle 54, as in FIG. 2. Alternatively, the drive shaft 40 and the lower platen shaft 58 are made separately and directly attached together at the desired tilt angle 54 by, for example, welding.

Figure 3:
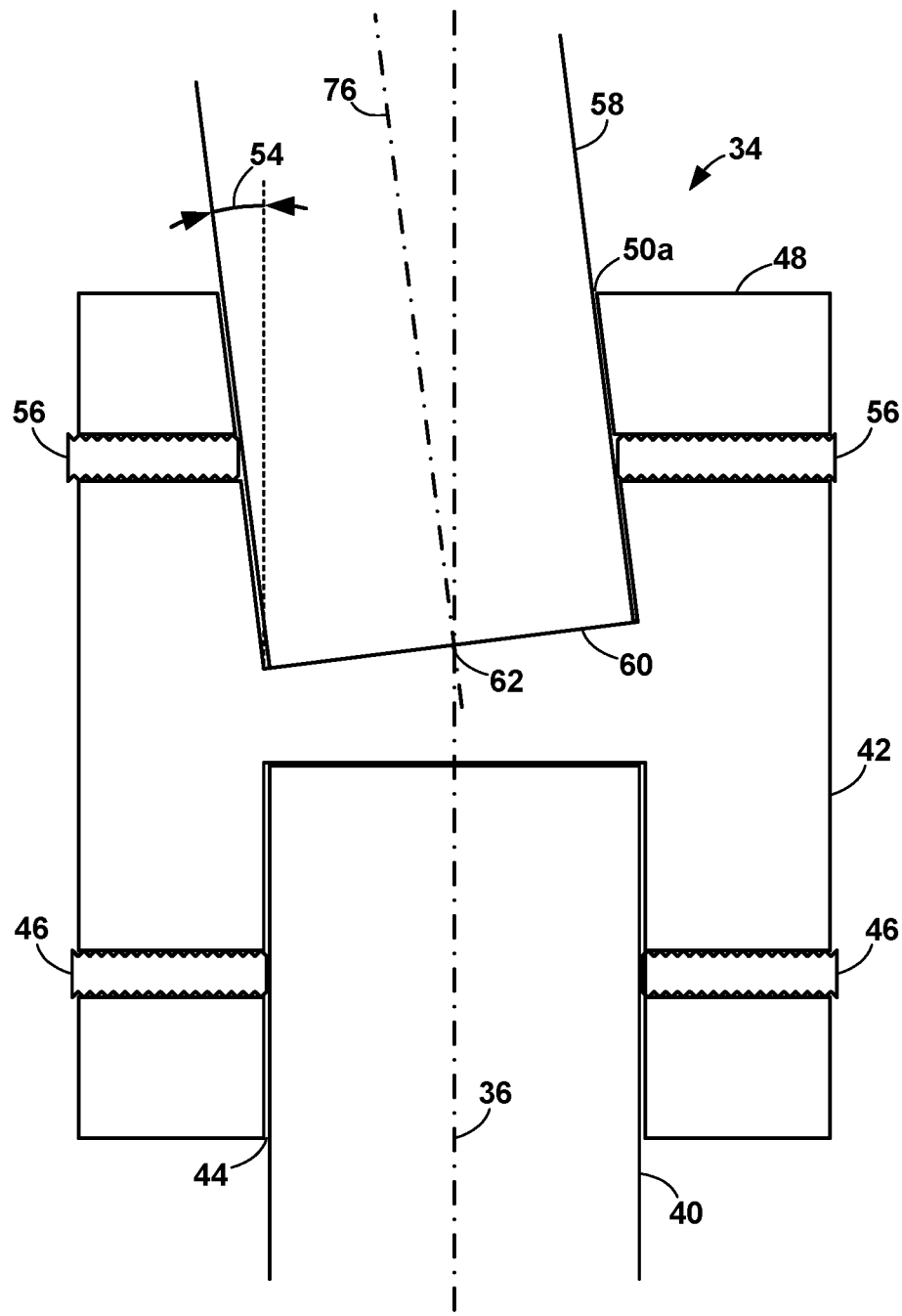
FIG. 3 is a detailed cross-sectional view of one configuration of the collar with the drive shaft and the platen shaft.
Figure 4:
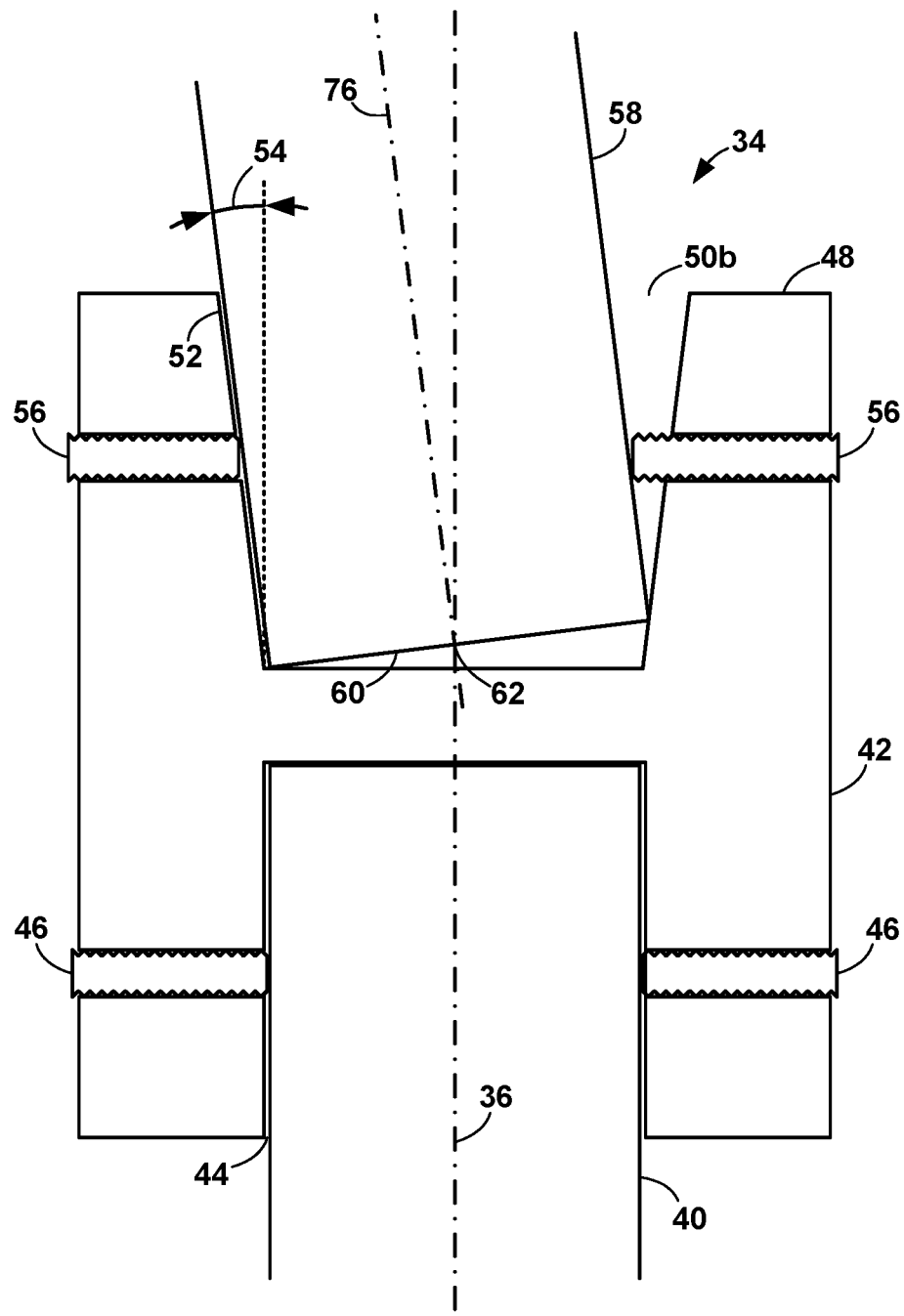
FIG. 4 is a detailed cross-sectional view of another configuration of the collar with the drive shaft and the platen shaft.
Figure 5:
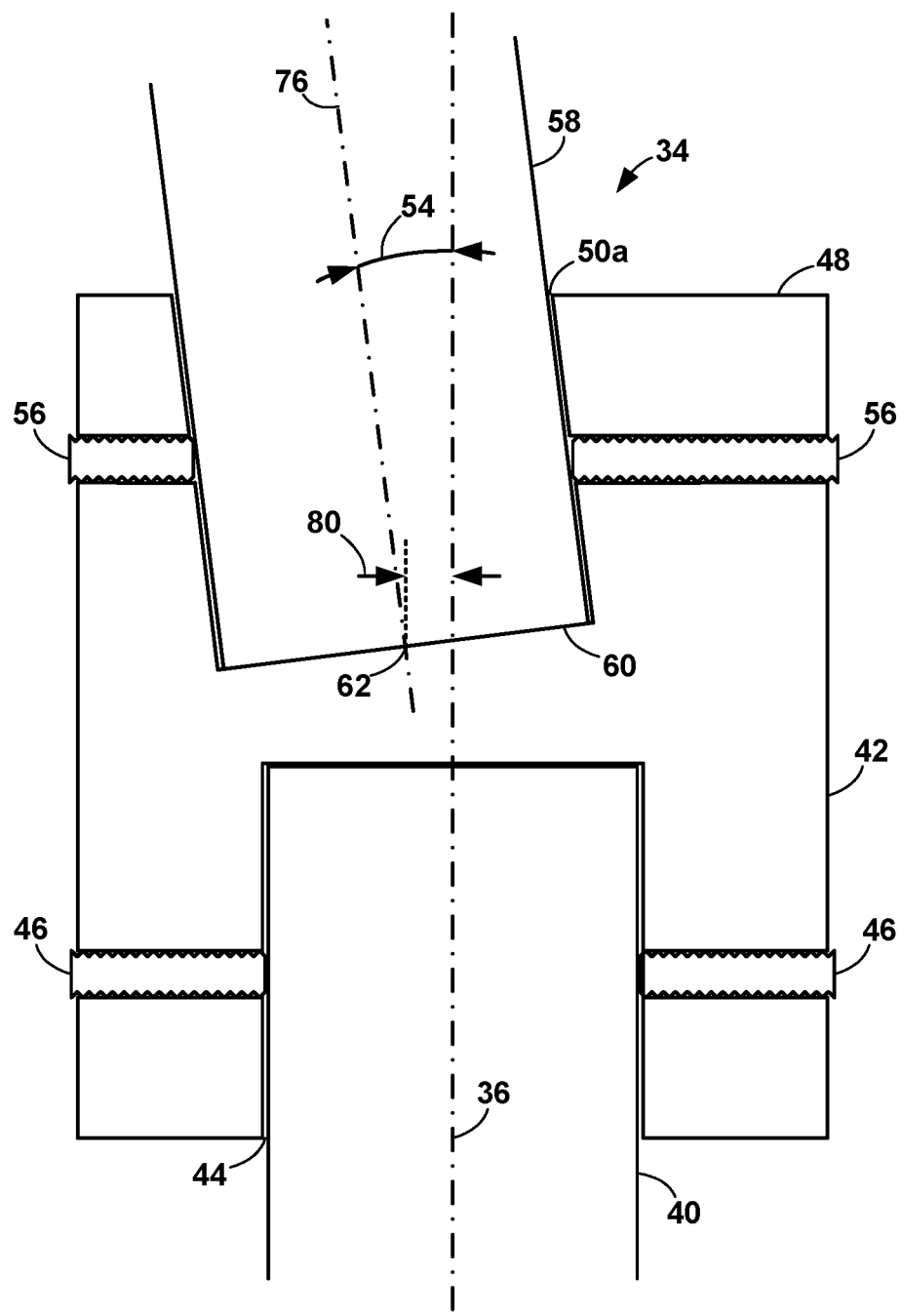
FIG. 5 is a detailed cross-sectional view of the configuration of FIG. 3 with a radially-offset tilted cavity.

In the current design, lower platen shaft 58 is attached to the drive shaft 40 by a collar 42, as shown in FIGS. 3-5. The collar 42 is attached to the drive shaft 40 so that the collar 42 rotates axially with the drive shaft 40 on the system axis 36. The drive shaft 40 has a cross-section, typically round, and fits into a cylindrical drive shaft cavity 44 in the collar 42 with the same cross-section. Typically the drive shaft 40 is secured in the drive shaft cavity 44 by one or more set screws 46, but the present invention contemplates that any other manner of securing the collar 42 to the drive shaft 40 can be used. Examples include welding the collar 42 to the drive shaft 40 and forming the drive shaft 40 and collar 42 as a single component. Optionally, the drive shaft 40 and drive shaft cavity 44 are keyed so that the collar 42 cannot rotationally slip on the drive shaft 40.

The lower platen shaft 58 attaches to the collar 42 so that lower platen shaft 58 extends upwardly at the tilt angle 54.

In one configuration, shown in FIGS. 3 and 5, the top end 48 of the collar 42 has a cavity 50a that is at the tilt angle 54 to the system axis 36. The cavity 50a has a cross-section that is the same shape as the lower platen shaft 58, which is typically round. In another configuration, shown in FIG. 4, the top end 48 of the collar 42 has a truncated conical cavity 50b with the cavity wall 52 at the tilt angle 54 to the system axis 36. The term, "tilted cavity 50", is intended to refer to both the tilted cavity 50a and conical cavity 50b.

The bottom end 60 of the lower platen shaft 58 is secured in the tilted cavity 50. Typically, the lower platen shaft 58 is secured by one or more set screws 56, but the present invention contemplates that any other manner of securing the lower platen shaft 58 to the collar 42 can be used. Examples include welding the lower platen shaft 58 to the collar 42 and forming the lower platen shaft 58 and collar 42 as a single component that mounts to the drive shaft 40. Optionally, the lower platen shaft 58 and tilted cavity 50 are keyed so that the lower platen shaft 58 cannot rotationally slip in the tilted cavity 50.

FIGS. 2-4 show the center 62 of the bottom end 60 of the lower platen shaft 58 coincident with the system axis 36. The present invention also contemplates that the center 62 of the bottom end 60 of the lower platen shaft 58 can be radially offset from the system axis 36, as in FIG. 5.

The top end 78 of the lower platen shaft 58 is attached to the center of the bottom surface 66 of the lower platen 22 by a rotating bearing 64. The bearing 64 allows the lower platen 22 to rotate freely on the lower platen shaft 58 such that the top surface 70 of the lower platen 22 rotates perpendicularly to the lower platen shaft axis 76.

Figure 6:
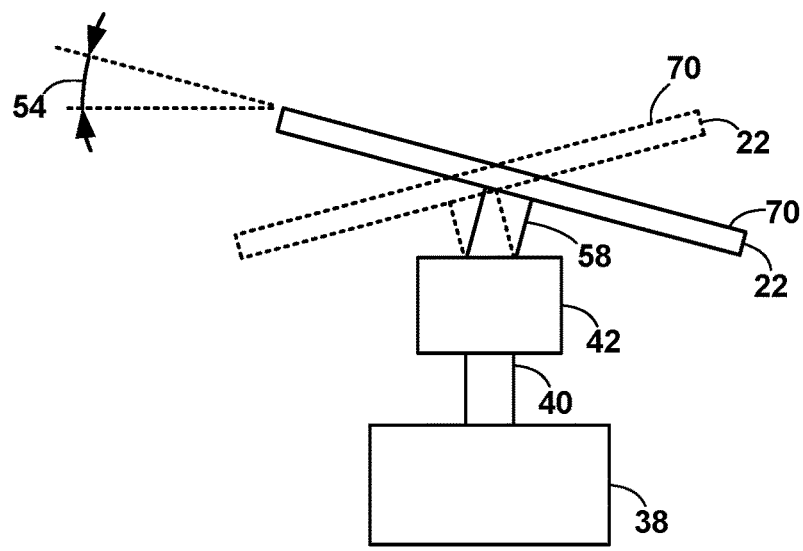
FIG. 6 is a side view of the lower platen seen at one rotational position of the lower platen and, in phantom, 180° of rotation from that position.

Because the lower platen shaft 58 tilts at a tilt angle 54 from vertical, the top surface 70 of the lower platen 22 is tilted at the same tilt angle 54 from horizontal, as shown in FIG. 6. As the motor 38 rotates, when looking at the edge 68 of the lower platen 22 with the lower platen 22 not rotating with the platen shaft 58 (in other words, as if the rotating bearing 64 is not operational), a point on the edge 68 appears to move up and down. At opposed rotational positions, the top surface 70 appears to form a flattened X when seen from the side, as shown exaggeratedly in FIG. 6.

Figure 7:
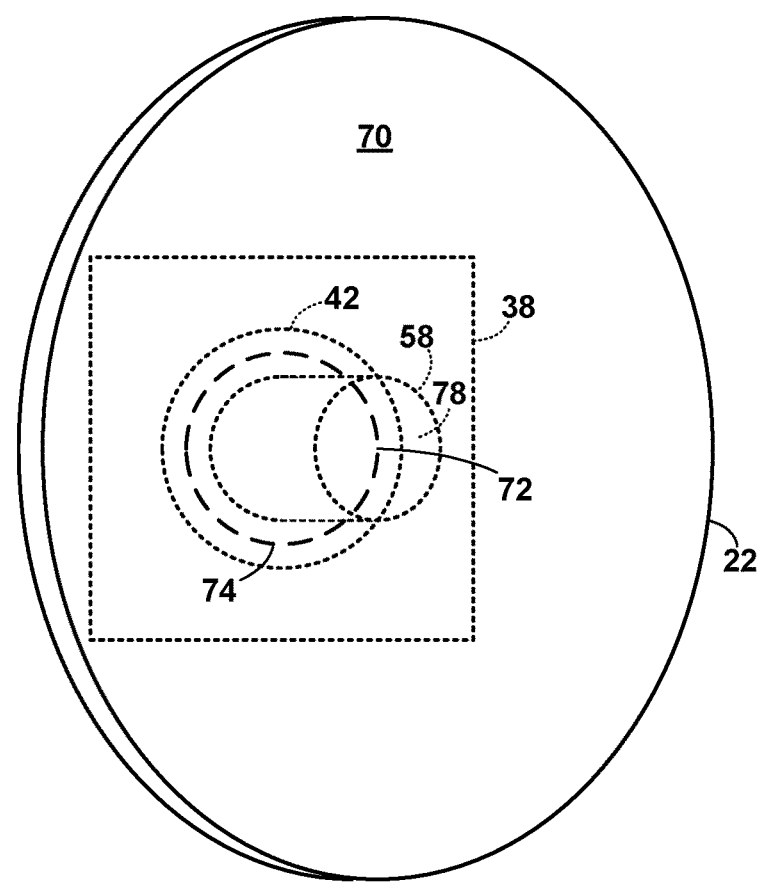
FIG. 7 is a top view of the circle traced by the center of the lower platen.

Further, the center 72 of the top surface 70 traces a circle 74 around the system axis 36 when seen from the top, as in FIG. 7. The diameter of that circle 74 depends on the tilt angle 54 and the distance along the lower platen shaft axis 76 from the system axis 36 to the center 72 of the top surface 70 of the lower platen 22. The present invention contemplates that the circle 74 can have a diameter ranging from 0.5" to 1.5". The tilted and rotating motion of the lower platen 22 is referred to as "gyration" in the present specification.

In one configuration, the top surface 70 of the lower platen 22 is flat so as to accept a dough ball directly onto the surface 70. Optionally, the perimeter 80 of the lower platen 22 has a raised lip 82 to prevent the dough from stretching greater than a predetermined diameter and to optionally produce a raised edge.

In another configuration, the lower platen 22 is designed to retain a pizza pan into which the dough is placed. The dough is stretched directly in the pan. Such a design can include clips on the lower platen perimeter that hold the pan in place. For example, three clips arranged 90° apart on the lower platen perimeter leaves a 180° opening for placing the pan on the lower platen 22.

Optionally, the lower platen 22 is designed to accommodate both configurations. The top surface 70 of the lower platen 22 is flat so it can accept the dough directly and the lower platen 22 has perimeter clips to hold a pizza pan.

Optionally, the lower platen 22 is removable. This provides for easier cleaning and also makes it possible to use lower platens 22 of different sizes for making pizza crusts of different sizes.

The upper platform 16 supports a reciprocating mechanism 24 by which the operator raises and lowers an upper platen 20. The upper platen 20 has a flat bottom surface 86, preferably round, that is centered on the vertical system axis 36. The top surface 88 of the upper platen 20 is attached to the bottom end 32 of an upper platen shaft 26 by whatever means is adequate. In the present design, the upper platen 20 is bolted to a plate that is welded to the upper platen shaft 26. Optionally, the upper platen 20 is removable from the upper platen shaft 26.

The reciprocating mechanism moves 24 the upper platen shaft 26 up and down. Typically, the reciprocating mechanism 24 will be within a housing 28 so that the mechanism 24 is not exposed for safety reasons.

The present invention contemplates the use of any reciprocating mechanism 24 known in the art. One such mechanism 24 is described in U.S. Pat. No. 6,769,898, incorporated herein by reference. A pair of mated interlocking components, one attached to the upper platen shaft 26 and one attached to the housing 28, provide stability for vertical reciprocation. The drive mechanism 24 includes a rack on the shaft interlocking component, a mating pinion fixed to an axle that is part of a handle 30 that an operator uses to raise and lower the upper platen. Counterbalance for the upper platen/shaft is provided by a torsion spring assembly.

Another such mechanism 24 is described in U.S. Pat. No. 7,001,170, incorporated herein by reference. A pair of spaced cams are mounted on an axle that is rotated by a handle 30. Each of the cams has a spiral slot. Each end of a horizontal rod attached to the upper platen shaft 26 rides in the spiral slots. As the handle 30 is moved up and down, the cams rotate, causing the rod to move vertically and the upper platen shaft 26 to reciprocate vertically.

Optionally, the reciprocating mechanism 24 is operated by an electrical or pneumatic mechanism rather than manually.

To operate, a dough ball is placed in the center of the lower platen 22 and the motor 38 is turned on. Slight friction within the rotating bearing 64 causes the lower platen 22 to rotate with the lower platen shaft 58. However, rotation of the lower platen 22 can be stopped with a touch by the operator that overcomes the slight friction within the rotating bearing 64.

As the upper platen 20 is lowered, it touches the dough, causing the lower platen 22 to stop rotating with the lower platen shaft 58. As the lower platen 22 gyrates, the upper platen 20 flattens the dough and pushes it outwardly toward the edge of the lower platen 22, much as a person's hand does when making a pizza crust.

Figure 8:
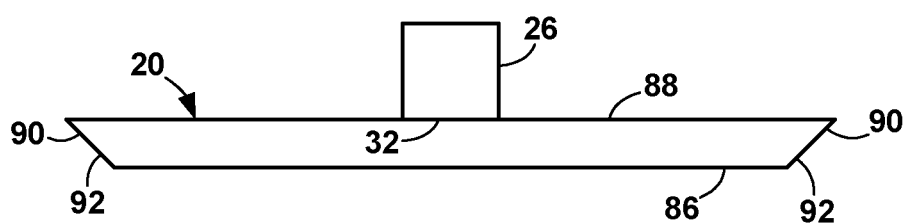
FIG. 8 is a side cross-sectional view of the upper platen showing the beveled edge feature.

To facilitate stretching the dough in several different ways, the present invention contemplates that the upper platen 20 can have several different feature configurations. In one, shown in FIG. 8, the edge 90 of the upper platen 20 is beveled, as at 92, such that the bottom surface 86 is smaller in diameter than the top surface 88. The beveled edge 92 helps to push the dough outwardly.

Figure 9:
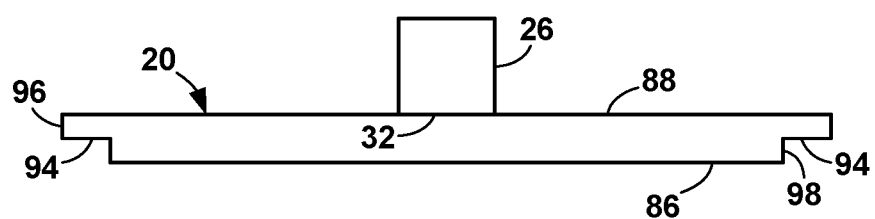
FIG. 9 is a side cross-sectional view of the upper platen showing the notched edge feature.

In another, shown in FIG. 9, the bottom surface 86 is formed with an annular shoulder 94 around the edge 90 so that the lower portion 98 of the upper platen 20 has a smaller diameter than the upper portion 96. This feature produces a raised edge on the dough after stretching so that a thicker crust edge is formed during baking.

Thus it has been shown and described a dough stretcher. Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A dough stretcher comprising:
   (a) a drive shaft mounted to rotate on a vertical system axis;
   (b) a mechanism for rotating the drive shaft at a speed in the range of between 40 RPM and 100 RPM;
   (c) a lower platen shaft having a bottom end, a top end, and an axis, the bottom end attached to the drive shaft and extending upwardly such that the lower platen shaft axis is at a tilt angle from the system axis in the range of from 1° to 4°;
   (d) a lower platen with a top surface and a bottom surface, the bottom surface rotatably attached to the top end of the lower platen shaft such that the lower platen top surface rotates perpendicularly about the lower platen shaft axis; and
   (e) an upper platen with a flat bottom surface and a center, the upper platen mounted above the lower platen to reciprocate vertically with the upper platen center on a system axis.

2. The dough stretcher of claim 1 wherein the tilt angle is about 3°.

3. The dough stretcher of claim 1 wherein the rotational speed in about 78 RPM.

4. The dough stretcher of claim 1 wherein the mechanism for rotating the drive shaft includes an electric motor.

5. The dough stretcher of claim 1 wherein the upper platen is mounted to be reciprocated manually.

6. The dough stretcher of claim 1 wherein the lower platen shaft is attached to the drive shaft by a collar.

7. The dough stretcher of claim 6 wherein the collar has a drive cavity for accepting the top end of the drive shaft and a tilted cavity for accepting the bottom end of the lower platen shaft.

8. The dough stretcher of claim 1 wherein the lower platen flat surface and the upper platen flat surface are round.

9. The dough stretcher of claim 1 wherein the lower platen is removable.

10. The dough stretcher of claim 1 wherein the lower platen has clips for retaining a pizza pan.

11. A dough stretcher comprising:
    (a) a drive shaft mounted to rotate on a vertical system axis;
    (b) an electric motor for rotating the drive shaft at a speed in the range of between 40 RPM and 100 RPM;
    (c) a collar having a top end and being attached to the drive shaft to rotate coaxially with the drive shaft, a tilted cavity in the top end at a tilt angle from the system axis in the range of from 1° to 4°;
    (d) a lower platen shaft having a bottom end, a top end, and an axis, the bottom end secured in the tilted cavity such that the lower platen shaft is at the tilt angle to the system axis;
    (e) a lower platen with a top surface and a bottom surface, the bottom surface rotatably attached to the top end of the lower platen shaft such that the lower platen top surface rotates perpendicularly about the lower platen shaft axis; and
    (f) an upper platen with a flat bottom surface and a center, the upper platen mounted above the lower platen to reciprocate vertically with the upper platen center on a system axis.

12. The dough stretcher of claim 11 wherein the tilt angle is about 3°.

13. The dough stretcher of claim 11 wherein the rotational speed in about 78 RPM.

14. The dough stretcher of claim 11 wherein the upper platen is mounted to be reciprocated manually.

15. The dough stretcher of claim 11 wherein the lower platen flat surface and the upper platen flat surface are round.

16. The dough stretcher of claim 11 wherein the lower platen is removable.

17. The dough stretcher of claim 11 wherein the lower platen has clips for retaining a pizza pan.

18. A dough stretcher comprising:
    (a) a drive shaft mounted to rotate on a vertical system axis;
    (b) an electric motor for rotating the drive shaft at a speed 78 RPM;
    (c) a collar having a top end and being attached to the drive shaft to rotate coaxially with the drive shaft, a tilted cavity in the top end at a tilt angle from the system axis of about 3°;

(d) a lower platen shaft having a bottom end, a top end, and an axis, the bottom end secured in the tilted cavity such that the lower platen shaft is at the tilt angle to the system axis;

(e) a lower platen with a round top surface and a bottom surface, the bottom surface rotatably and removably attached to the top end of the lower platen shaft such that the lower platen top surface rotates perpendicularly about the lower platen shaft axis; and (f) an upper platen with a round, flat bottom surface and a center, the upper platen mounted above the lower platen to reciprocate vertically with the upper platen center on a system axis.

19. The dough stretcher of claim 12 wherein the upper platen is mounted to be reciprocated manually.

20. The dough stretcher of claim 12 wherein the lower platen has clips for retaining a pizza pan.

\* \* \* \* \*